Patented Jan. 9, 1951

2,537,636

UNITED STATES PATENT OFFICE 2,537,636

STABILIZATION OF RUBBER AND RUBBERY POLYMERS AND THE STABILIZED PRODUCTS

Leland J. Kitchen, Akron, Ohio, assignor to The Firestone Tire & Rubber Company, Akron, Ohio, a corporation of Ohio No Drawing. Application March 9, 1946,
Serial No. 653,426

18 Claims. (Cl. 260—45.95)

This invention relates to new methods of stabilizing rubbers and the resulting products.

According to this invention, nuclearly terpenylated hydroxy aromatic hydrocarbons are used as stabilizers. The terpenylphenols are usually prepared by terpenylation of a phenol (which may be an alkylated phenol) with a terpene hydrocarbon in the presence of an acid catalyst, such as a strong acid, ferric chloride and like salts, siliceous earths, halogens, etc. The usual reaction products contain terpenyl ethers of phenols and terpene polymerization products admixed with the nuclearly terpenylated phenols. Although it appears that only the terpenylphenols having free phenolic groups are stabilizers of rubber and synthetic rubbers, the reaction mixtures may be used provided they contain a substantial percentage of the nuclearly terpenylated hydroxyaryl hydrocarbon.

Substantially pure compounds are preferred to mixtures for various obvious reasons. The invention includes the 2,4-dialkyl-6-terpenylphenols, which are new compositions of matter, and methods of obtaining them substantially free from reaction products.

It is admitted that alkylated phenols have been suggested as stabilizers for rubber, etc. The terpenylated phenols are preferred to the corresponding alkylated phenols for stabilization of both natural and synthetic rubbers because they are less volatile. They are nonstaining and are, therefore, preferred to certain of the well-known stabilizers, such as the diarylamines which discolor. The terpenes are chemically related to natural rubber and certain synthetic rubbers and are more compatible with these than the alkylated phenols, etc.

The terpenylated phenols I prefer to use are the 2,4-dialkyl-6-terpenylphenols. They may be obtained substantially free from contaminating impurities, such as terpenyl ethers of phenols, polymerization products, etc. Depending upon the starting materials, the product may be a single terpenylphenol or a mixture of terpenylphenols.

The terpenylphenols of this invention may be prepared by heating a phenol with a terpene as described in Wuyts (U. S. 1,469,709; British 204,754; German 396,106) or by the processes of Bruson (U. S. 2,148,432) or Powers (U. S. 2,343,845).

Among the phenols which are suitable starting materials for the preparation of the terpenylphenol stabilizers are phenol, ortho-, meta-, and para-cresol, the various xylenols and tri-methylphenols, 2-methyl-4-ethylphenol, p-ethylphenol, p-isopropylphenol, p-tert-butylphenol, 2,4-diisopropylphenol, p-tert-octylphenol, etc.

The terpene used as terpenylating agent may be alpha- or beta-pinene, camphene, carene, tricyclene, etc. Terpene polymers may be used as described by Carmody and Kelly (U. S. 2,319,386). The terpenes having hydroxyl groups which may be used include borneol, terpineol, fenchyl alcohol, etc.

The terpenylating agent need not be a pure terpene. Commercial products containing high percentages of terpenes may be used, among which may be mentioned pine oil, oil of turpentine, coniferous-wood oils, etc.

The terpenylated phenol used for stabilization need not be prepared by reaction with the terpene. It may, for example, be made by the Friedel-Crafts' reaction. (See Roblin and Hechenbleikner U. S. 2,311,282.)

Camphene is a preferred terpenylating agent because of its availability and the ease with which it condenses with phenols.

A. 2,4-DIALKYL-6-TERPENYLPHENOLS

In general, steric hindrance prevents the inclusion of a terpenyl group and two large alkyl groups in the same 2,4-dialkyl-6-terpenylphenol. The commercial compounds of this type will, therefore, probably be limited to those compounds with alkyl substituents containing no more than five carbon atoms, and these are the preferred compounds of this invention. The preferred compounds of this type are the 2,4-dimethyl-6-terpenylphenols and the 2,4-dialkyl-6-isobornylbornyl-, and menthenyl-phenols, including 2,4-dimethyl - 6 - isobornylphenol, 2,4 - dimethyl - 6 - bornylphenol and 2,4 - dimethyl - 6 - menthenylphenols. According to the preferred process of this invention, the 2,4-dialkyl-6-terpenylphenols are obtained by condensation of a 2,4-dialkylphenol with a terpene hydrocarbon in the presence of an acidic catalyst while heating at a temperature of about 70 to 130° C., preferably with subsequent extraction of the reacted mixture with an alkali metal base to remove unreacted phenol.

Most of the 2,4-dialkylphenols used in preparing the compounds of this invention are soluble in water solutions of alkali metal bases. The 2,4-dialkyl-6-terpenylphenols are insoluble or relatively insoluble in these reagents. Treatment with an alkali metal hydroxide solution, therefore, affords a valuable method of separating from the desired dialkyl-terpenylphenol any excess or unreacted 2,4-dialkylphenol used in its preparation.

The 2,4-dialkylphenols used as starting materials include those in which the alkyl groups are any of the following or a combination of any of the following: methyl, ethyl, propyl, isopropyl, n-butyl, sec-butyl, isobutyl, tert-butyl or any of the various amyl groups. In general, larger alkyl groups are excluded from the invention, particularly those in the ortho position, because through steric hindrance there is a tendency of the larger alkyl groups to prevent reaction of the nuclear carbons of the phenols with the terpene groups. The 2,4-dimethylphenol is preferred for carrying out the reaction not only because it reduces steric hindrance to a minimum but also because it is more readily soluble in alkali metal hydroxides than some of the other starting materials indicated above.

In the case of a terpene wherein there are double bonds in conjugation or a monocyclic terpene capable of isomerizing to a conjugated terpene, it is believed that the yield of 2,4-dialkyl-6-terpenylphenol is reduced by chroman formation. Therefore stably bicyclic and tricyclic terpenes are preferred over the acyclic terpenes, the monocyclic terpenes and bicyclic terpenes which readily form monocyclic terpenes; and those not containing conjugated double bonds are preferred over those containing conjugated double bonds.

In using monocyclic terpenes which contain two double bonds, if both bonds are of the same order of activity, the resulting product will be a mixture of two isomers.

The terpenes preferred for commercial operations because of their availability are camphene, alpha-pinene, and nopinene (beta-pinene). Other bicyclic terpenes which may be used include carene, the fenchenes, and bornylene. Tricyclic terpenes—for instance, tricyclene and cyclofenchene—may be used as terpene starting materials even though they contain no unsaturated linkages.

The acidic catalysts which may be used in carrying out the process include, for example, such well-known catalysts as sulfuric acid, phosphoric acid, benzenesulfonic acid, p-toluene-sulfonic acid, stannic chloride, zinc chloride, aluminum chloride, fluoboric acid, hydrofluoric acid, ferric chloride, and the boron trihalides, such as boron trichloride, boron trifluoride, and their ether complexes. A few per cent of the weight of the catalyst is usually sufficient to give the desired reaction.

Boron trifluoride and benzenesulfonic acid are generally preferred for use as catalysts. Sulfuric acid tends to cause undesirable side reactions, such as sulfonation, oxidation, and polymerization particularly at higher temperatures so that when this catalyst is used, a temperature not higher than 80° C. will ordinarily be preferred to minimize the side reactions. Boron trifluoride-ether complex in the higher temperature range—for example, from 110° to 130° C.—is usually considered objectionable in catalytic reactions and should usually be avoided in the production of the compounds of this invention because of its tendency to be removed from the reaction mixture and deposited on the walls of the condenser.

At temperatures above 130° C. there is a tendency for the terpenes to undergo undesirable side reactions, such as isomerization and polymerization. Therefore, in carrying out the condensation, a temperature of about 70° to about 130° C. will be employed. This preferred range is not indicated by the prior art on the terpenylation of alkylphenols.

In carrying out the reaction, equimolecular proportions of the dialkylphenol and terpene hydrocarbon may be used although the ratio may be altered widely in favor of either reactant. It usually is desirable to use an excess of the dialkyl phenol if it is readily extractable from the reaction mixture by a base, such as an alkali metal hydroxide.

It frequently is desirable to have a diluent present in order to facilitate agitation during the condensation reaction and to aid in the working up of the reaction mixture by lowering its viscosity since the 2,4-dialkyl-6-terpenylphenols are highly viscous liquids when in the liquid state. The diluents which may be used satisfactorily include benzene, toluene, ethylene chloride, and cyclohexane.

The 2,4-dialkyl-6-terpenylphenols usually are obtained as highly viscous liquids having a refractive index of about 1.52–1.54 ($n_D$) and a boiling point of at least 190° C. at 10 millimeters of mercury. The first three of the following examples illustrate the process of producing the 2,4-dialkyl-6-terpenylphenols.

B. PREPARATION OF TERPENYLPHENOLS

Example 1

2,4-DIMETHYL-6-ISOBORNYLPHENOL

Equimolecular amounts of camphene and 2,4-dimethylphenol—272 grams of camphene and 244 grams of 2,4-dimethylphenol—were dissolved in 300 milliliters of diluent toluene; and 8 grams of catalyst, 70 per cent benzenesulfonic acid, were added. The mixture was heated at 129–130° C. for nine and one-half hours, then partially cooled, shaken once with about 500 milliliters of 10 per cent NaOH solution, and distilled, using a Raschig-ring packed column with an efficiency of about five theoretical plates. Toluene was distilled from the reacted mixture at atmospheric pressure; and camphene and dimethylphenol were then distilled at 17 millimeters, then 10 millimeters. The recovered camphene and dimethylphenol along with the dimethylphenol obtained by acidification of the caustic washings amounted to 55 per cent of the weight of the starting reactants.

After collecting an 11-gram fore-run, 174 grams of 2,4-dimethyl-6-isobornylphenol were obtained as a highly viscous liquid with a light yellow tinge and boiling in the range 184–195°/10 millimeters; it had $n_D^{22}=1.5396$. Seven grams of residue remained in the still-pot.

The 2,4-dimethyl-6-isobornylphenol fraction soon crystallized on standing at room temperature. After recrystallization from petroleum ether, the soft furry crystals had a melting point of 81.6 to 81.9° C.

The estimated total yield of 2,4-dimethyl-6-isobornylphenol was 35 per cent, or 89 per cent based upon unrecovered starting materials.

Example 2

2,4-DIMETHYL-6-ISOBORNYLPHENOL

One hundred grams of 2,4-dimethylphenol containing 5 grams of concentrated sulfuric acid as catalyst were heated at 70–80° C. with stirring for ninety minutes; during the first thirty minutes, 123 grams of camphene were added in small amounts. The reaction mixture was washed, first with water, then with potassium carbonate solution. The oil layer was dried over anhydrous $K_2CO_3$, then distilled. After 56 grams of camphene fraction and 61 grams of 2,4-dimethylphenol fraction had been distilled, 64 grams of crude 2,4-dimethyl-6-isobornylphenol were obtained as a light yellow viscous liquid distilling in the range 105–163° C. at about 2 millimeters; the main portion distilled at 142–147° C. The product had $n_D^{27.5}=1.5366$; yield was 30 per cent. Thirteen grams of residue remained in the still-pot.

*Example 3*

2,4-DI-SEC-BUTYL-6-ISOBORNYLPHENOL

A mixture of 206 grams of 2,4-di-sec-butylphenol, 150 grams of camphene (10 per cent excess), and 7 grams of catalyst (boron trifluoride-ether complex) in 150 milliliters of toluene diluent was heated at 120–125° C. for 7 hours. Another 150 milliliters of toluene were added to the viscous dark brown reaction mixture to facilitate handling, and the mixture was washed twice with 10 per cent NaOH solution. It then was distilled through a column having an efficiency of about five theoretical plates. After distillation of the solvent and 118 grams of low-boiling material containing about 74 grams of unreacted 2,4-di-sec-butylphenol (boiling point 144°/10 millimeters), there was obtained 196 grams (58 per cent yield) of product, 2,4-di-sec-butyl-6-isobornylphenol, a highly viscous yellow liquid which was collected at 180–205° C./3 millimeters and which had the refractive index $n_D^{23}=1.5195$. Forty grams of solid resin remained in the still-pot.

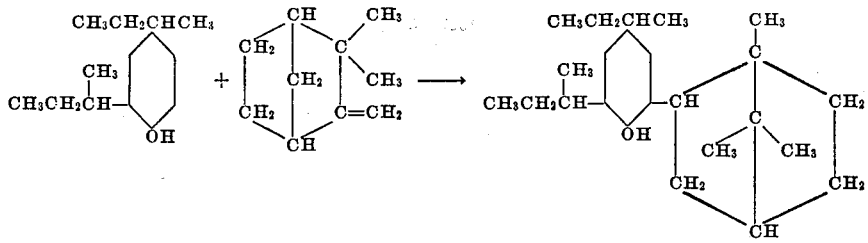

*Example 4*

2,6-DIISOBORNYL-4-METHYLPHENOL

Two hundred seventy-five grams of camphene were added during five hours to 100 grams of p-cresol which contained 10 milliliters of 70 per cent benzene sulfonic acid as catalyst, the temperature being kept at 40 to 50° C. After the addition of the camphene, the viscous brown mixture was heated at 90–105° C. for 15 hours. The recovered mixture was diluted with toluene to reduce its viscosity, washed with potassium carbonate solution to remove catalyst, and dried over anhydrous potassium carbonate. The dried mixture was distilled without a column; after removal of solvent and some terpene material, the distillation was completed under vacuum, the following fractions being collected:

1. Seven grams of distillate with a phenolic odor and a boiling point up to 100° C./5 millimeters
2. Sixty-six grams of viscous red liquid with a boiling point of 163–210° C./3 millimeters
3. Two hundred and eight grams of light brown solid resin with a boiling point of 210–245° C./3 millimeters
4. Thirteen grams of residue remained.

Fraction 3, presumably composed largely of 2,6-diisobornyl-4-methylphenol, is an excellent nondiscoloring stabilizer.

*Example 5*

BORNYLATED CRESYLIC ACID

A mixture of terpenylphenols was prepared by terpenylating a cresylic acid with bornyl chloride. The cresylic acid was a fraction derived from petroleum having a boiling-point range of 92–121° C./10 millimeters. This fraction is thought to have the following composition:

| | Per cent |
|---|---|
| Xylenols | 8–10 |
| C₃ alkylphenols (trimethyl- and methylethylphenols) | 45–55 |
| C₄ alkylphenols | 30–40 |

Fifty-three grams of the cresylic acid containing 25 grams of aluminum chloride as catalyst were treated with 53 grams of bornyl chloride dissolved in dry ethylene chloride. The mixture was heated at 45° C. for 4 hours, then at 65° C. for an hour, and finally at 80° C. for 4 hours. The mixture was poured into water, some petroleum ether was added as diluent, and the oil layer was washed thoroughly. It was distilled; after removal of solvent and a 21-gram fraction of 99–116° C./10 millimeters boiling point, 49 grams of terpenylphenol were collected at 140–275° C./5 millimeters, leaving 24 grams of residue. The distillate of terpenylphenols was a viscous orange liquid which was found to be a good stabilizer.

*Example 6* p-ISOBORNYLPHENOL

A mixture of ten moles each of phenol and camphene along with 2 grams of catalyst (70 per cent benzenesulfonic acid) was heated at 105° for sixteen hours. Six hundred milliliters of toluene were added to reduce the viscosity; and the mixture was washed with potassium carbonate solution and with water, dried over anhydrous K₂CO₃ and distilled. Besides solvent and unchanged starting materials, the following products were obtained, the yields being based upon the amounts of starting materials used:

1. Phenyl isobornyl ether (colorless, slightly viscous liquid having a boiling point of 151°/10 millimeters and $n_D^{25}=1.5241$), 50 per cent
2. p-Isobornylphenol (viscous liquid of boiling point 170–181°/10 millimeters and $n_D^{25}=1.5453$; solidified on standing), 2 per cent

C. STABILIZATION OF BUTADIENE-ACRYLONITRILE COPOLYMER

The terpenylphenols, however prepared, are nondiscoloring stabilizers for rubber-like copolymers of butadiene and acrylonitrile and like synthetic rubbers. The preferred stabilizers of this class are the 2,4-dialkyl-6-terpenylphenols. Also preferred are the terpenylphenols which contain at least one isobornyl substituent.

The rubbery butadiene-acrylonitrile copolymers which are noted for resistance to oil and hydrocarbons contain a minor proportion of acrylonitrile, for example, from about 15 to 45 per cent. These copolymers are characterized by a marked tendency to undergo various deteriorative changes unless protected by stabilizers. These changes, which are thought to involve oxygen and oxidative deterioration, include stiffening and loss in processing qualities, discoloration, and resinification. Stiffening is particularly noticeable in this type of copolymer when compared with butadiene-styrene copolymers, for example, since the same highly polar nitrile groups which impart oil resistance to the copolymer also tend to impart stiffness.

The undesirable changes are prevented or largely inhibited by the use of effective stabilizers. Phenyl-beta-naphthylamine is recognized as an effective stabilizer but possesses several disadvantages not inherent in the stabilizers of this invention.

A chief disadvantage in the use of phenyl-beta-naphthylamine is the likelihood of its discoloring the copolymer to which it is added when the composition is exposed to heat or light. Light-colored copolymers, such as those loaded with zinc oxide or titanium dioxide, discolor badly even when the stabilizer is present only in small proportions, for example, 0.5 to 2 per cent. White and light-colored copolymers—whether in the green state or after curing—are stabilized without discoloration by terpenylphenols. These stabilizers have low toxicity when compared with phenyl-beta-naphthylamine and other antioxidants of the secondary aromatic amine type.

The stabilizers may be incorporated in the copolymer compositions in any conventional manner as by adding them to the uncured rubber on a mill or in a Banbury mixer. However, it is preferable to add the stabilizer directly to the copolymer latex and preferably immediately after the copolymerization reaction has been carried out and before coagulation. In the absence of a stabilizer, the butadiene-acrylonitrile copolymers, and particularly those containing less than about 40 per cent of acrylonitrile, are so subject to deterioration and change in properties that an appreciable change may take place even during the drying of the copolymer obtained from the latex. Drying is usually carried out for about 30 minutes at a temperature of about 240° F. on the commercial scale and at 70-75° F. for about 20 hours on the laboratory scale.

Incorporation of the stabilizer with the latex is conveniently accomplished by stirring an emulsion of the stabilizer into the latex to be stabilized. Such an emulsion may be prepared by agitating an alcoholic solution of the stabilizer with 5 per cent aqueous sodium oleate solution. The following data show the effect of the stabilizers of this invention on butadiene-acrylonitrile copolymers under a variety of test conditions and compare them with phenyl-beta-naphthylamine, a stabilizer which is widely used at the present time.

The first table compares the drying of latex coagula to which 2 per cent of a terpenylphenol and 2 per cent of phenyl-beta-naphthylamine were added and latex coagulum which contains no stabilizer. The latices were coagulated from the copolymerization emulsion with a solution of aluminum sulfate low in iron, and the coagula, after washing on a mill, were dried 20 hours at 75° C. The copolymer containing no stabilizer not only turned tan in color but also underwent noticeable deterioration, becoming hard and resinified on the surface. The two samples of copolymer containing the stabilizers were in excellent physical condition after drying, although that containing phenyl-beta-naphthylamine had discolored appreciably. The results of the test are recorded in Table I:

*Table I*
EXAMINATION OF DRIED COPOLYMER

| Stabilizer Present | Color | Condition |
|---|---|---|
| None | tan | deteriorated. |
| 2,4-dimethyl-6-isobornylphenol | white | excellent. |
| phenyl-beta-naphthylamine | lavender-tan | Do. |

The nondiscoloring stabilizer of this invention prevented discoloration which occurred in the unstabilized polymer.

Various of the following tables record the results of tests on dried copolymer. Unless otherwise indicated, the coagulum was obtained and dried substantially as above described.

Further evidence of the stability of the uncured copolymer stabilized with the terpenylphenol was obtained by oven-aging at 90° C. for 4 days. The condition of the copolymers after such aging is recorded in the following table:

*Table II*
OVEN-AGING

| Stabilizer Present | Color | Condition |
|---|---|---|
| 2,4-dimethyl-6-isobornylphenol | cream tinge | very good; slightly heat-cured. |
| phenyl-beta-naphthylamine | brown | Do. |

The excellent stabilizing effect of the compounds of this invention is shown by the fact that hardly any discoloration of the first copolymer of the above table was noted even after oven-aging; whereas the control containing a well-known stabilizer had discolored markedly. The "heat-cured" condition of the treated products simulated a slight degree of cure which was readily reversed by milling.

Vulcanizates were prepared to further evaluate the stabilizing effect of the terpenylphenol. Copolymer containing 2 per cent of stabilizer was compounded according to the following formula:

| | |
|---|---|
| Copolymer + stabilizer | 100.0 |
| Stearic acid | 3.5 |
| Zinc oxide | 5.0 |
| Carbon black | 40.0 |
| Sulfur | 2.0 |
| Accelerator | 1.3 |

The accelerator used was N-cyclohexyl benzothiazyl sulfenamide. The stocks were cured at 274° F. for 80 minutes. The physical properties of the cured stocks before and after artificial aging are recorded in the following table:

*Table III*
PHYSICAL PROPERTIES OF CURED STOCKS

| | Stabilizer Present | Tensile at 300% Elongation | Ultimate Tensile | Ultimate Elongation |
|---|---|---|---|---|
| Normal properties | 2,4-dimethyl-6-isobornylphenol | 1,400 | 2,975 | 520 |
| | phenyl-beta-naphthylamine | 1,325 | 2,900 | 520 |
| Oven-aged 4 days at 212° F. | 2,4-dimethyl-6-isobornylphenol | 2,275 | 3,050 | 350 |
| | phenyl-beta-naphthylamine | 2,375 | 2,375 | 300 |
| Bomb-aged 10 hours at 260° F. (60# pressure). | 2,4-dimethyl-6-isobornylphenol | 2,575 | 2,725 | 320 |
| | phenyl-beta-naphthylamine | 2,500 | 2,625 | 320 |

The above data show that as a stabilizer the 2,4-dimethyl-6-isobornylphenol is the substantial equivalent of phenyl-beta-naphthylamine, which is widely used for stabilization of this type of butadiene-acrylonitrile copolymer.

The terpenylphenol and phenyl-beta-naphthylamine were also used to stabilize a white vulcanizate in order to compare their discoloring properties. The samples were prepared according to the following formula in which 2 per cent of the stabilizer was admixed with the copolymer in latex form:

| | |
|---|---|
| Copolymer + stabilizer | 100.0 |
| Coumarone resin | 7.5 |
| Sulfur | 3.0 |
| Magnesia | 5.0 |
| Zinc oxide | 85.0 |
| Neutral clay | 20.0 |
| Titanium dioxide | 20.0 |
| Benzothiazyl disulfide | 0.9 |
| Zinc diethyl dithiocarbamate | 0.4 |

The resulting stocks were vulcanized at 280° F. for 60 minutes and then subjected to light. The effect of the light is recorded in the following table:

Table IV
EFFECT OF LIGHT ON CURED STOCKS

| Stabilizer Present | Exposed to Fadeometer 10 Hours at 125° F. | Exposed to Sunlamp 16 Hours at 7 Inches |
|---|---|---|
| 2,4-dimethyl-6-isobornylphenol | off-white | off-white |
| phenyl-beta-naphthylamine | brown | gray-brown |

Thus, the white stock stabilized with terpenylphenol was markedly resistant to discoloration.

Fraction 3 of Example 4 was used in butadiene-acrylonitrile copolymer of the type containing 30 per cent acrylonitrile. Two per cent added to the latex was found to give excellent stabilization without objectionable discoloration. Tests on such coagulum and coagulum containing 2 per cent of phenyl-beta-naphthylamine are recorded below:

The p-isobornylphenol of Example 6 proved to be a nondiscoloring stabilizer for butadiene-acrylonitrile copolymer. When the stabilizer was added to the latex and the product then dried, the dried product was clean white in color. It turned tan on oven-aging for 4 days at 90° C. while the stock similarly stabilized with phenyl-beta-naphthylamine turned dark brown.

The terpenylated phenol product of Example 5 proved to be a nondiscoloring stabilizer for butadiene-acrylonitrile copolymer. Copolymer to which 2 per cent of this stabilizer had been added in latex form was tan in color after being heat-aged 4 days at 90° C. The heat-aged copolymer was in good physical condition. Identical copolymer aged without stabilizer underwent extensive deterioration and resinification.

D. STABILIZATION OF NATURAL RUBBER

The terpenylphenols inhibit flex-cracking and weather-checking of natural rubber vulcanizate without substantial discoloration and may be used in white side-wall tires and other light-colored products. They are particularly adapted for use in natural rubber because of their high compatibility which is due, at least in part, to the chemical similarity between them and rubber. The secondary aromatic amines are not suitable for use in light-colored products because they discolor badly on exposure to light and even in the dark on aging. Due to the fact that the stabilizers of this invention are nondiscoloring and highly compatible with natural rubber, they may be incorporated in relatively large amounts to inhibit flex-cracking and sun-checking so as to obtain more resistant rubbers than has heretofore been possible.

A test was made by mixing the terpenylphenol with the following control stocks:

| | |
|---|---|
| Pale crepe | 100.0 |
| Zinc oxide | 73.0 |
| Titanium dioxide | 20.0 |
| Wax | 2.0 |
| Stearic acid | 1.0 |
| Ultramarine | 0.1 |

Table V
EFFECT OF DRYING AND AGING COPOLYMER

| Stabilizer Present | Condition of Dried Copolymer before Aging | Condition of Copolymer After 4 Days at 90° C. |
|---|---|---|
| 2,6-diisobornyl-4-methylphenol | white; excellent condition | tan; good condition. |
| phenyl-beta-naphthylamine | lavender-tan; excellent condition | brown; very good condition. |

Copolymer to which 2 per cent of this stabilizer was added in latex form, was compounded according to the above formula containing carbon black, and the resultant mix was cured 60 minutes at 274° F. The following table records the properties of the vulcanizate compared with vulcanizate of the same copolymer containing a like amount of other stabilizer similarly compounded:

| | |
|---|---|
| Sulfur | 3.0 |
| Benzothiazyl disulfide | 0.4 |
| Activator | 0.5 |
| Total | 200.0 |

The rubber hydrocarbon present in the resulting test stock contained 1 per cent of the 2,4-

Table VI
PROPERTIES OF VULCANIZATE

| | Stabilizer Present | Tensile at 300% Elongation | Ultimate Tensile | Ultimate Elongation |
|---|---|---|---|---|
| Normal properties | 2,6-diisobornyl-4-methylphenol | 875 | 3,150 | 590 |
| | phenyl-beta-naphthylamine | 900 | 3,075 | 580 |
| Oven-aged 4 days at 212° F | 2,6-diisobornyl-4-methylphenol | 2,775 | 2,935 | 315 |
| | phenyl-beta-naphthylamine | 2,475 | 2,925 | 340 |
| Bomb-aged 10 hours at 260° F | 2,6-diisobornyl-4-methylphenol | 2,400 | 3,200 | 370 |
| | phenyl-beta-naphthylamine | 2,225 | 2,825 | 360 | dimethyl-6-isobornylphenol by weight. Thus, the concentration of this terpenylphenol in the compounded test stock was ½ of 1 per cent. The control stock was identical but contained no stabilizer. The stocks were cured 40 minutes at 280° F. The two stocks were tested in a weatherometer using sunshine carbons and no filters. The test lasted 4 hours. Neither the test strip containing the terpenylphenyl nor the control strip to which no inhibitor was added showed appreciable discoloration. A similar strip containing 1 per cent of phenyl-beta-naphthylamine turned tan in color on identical exposure for 4 hours.

The flex life of the strips was determined by flexing ½-inch dumbbell strips of 0.100 inch gauge, the strips being flexed from 0 to 75 per cent and the "flex life" being the total time required to bring six different strips (two each for three different cures) to the breaking point. The results were:

Table VII
FLEX-LIFE TEST

| Stock | Flex Life |
| --- | --- |
|  | Hours |
| control | 32.48 |
| 2,4-dimethyl-6-isobornylphenol | 39.47 |

Thus, the presence of a small amount of the terpenylphenol materially improved the flex life of this vulcanite prepared from pale crepe natural rubber. The improvement, due to the present of the terpenylphenol, was also noted by counting the number of cracks after failure. Examination of the strips was made under a microscope. The controls had three times as many cracks as the test strips even though the latter had been flexed for a period of time 22 per cent longer than the controls had been, at failure.

Further evidence of the stabilizer action of the terpenylphenol in natural rubber was obtained by an outdoor exposure test. Tapered vulcanite strips of 0.100 inch gauge were exposed at 12.5 per cent elongation to Florida winter sunlight for 2 months. After exposure, the strips were examined for "checking"; i. e., for formation of a network of small cracks. The results of the examination are recorded in the following table:

Table VIII
SUNLIGHT EXPOSURE

| Stock | Appearance after Exposure |
| --- | --- |
| blank | moderate checking. |
| 2,4-dimethyl-6-isobornylphenol | slight checking. |

E. STABILIZATION OF BUTADIENE-STYRENE COPOLYMER

The stabilizers of this invention retard or inhibit the aging of rubbery coplymers of butadiene and styrene or other copolymers of a conjugated diolefin and a vinyl benzene. The results of several tests are recorded to illustrate this.

The stabilizer is preferably added to the latex resulting from the emulsion copolymerization. Two per cent of a stabilizer of this invention and 2 per cent of phenyl-beta-naphthylamine were added to identical emulsions of a rubbery butadiene-styrene copolymer. These emulsions and an emulsion containing no stabilizer were then coagulated with aluminum sulfate, and the respective copolymer compositions were dried and aged. The following table compares the effect of the different stabilizers and shows the effect of each by comparison with the copolymer which contains no stabilizer:

Table IX
COPOLYMER AGING

| Antioxidant | After Drying 20 Hours at 75° C. | Oven-aged One Day at 110° C. |
| --- | --- | --- |
| 2,4-dimethyl-6-isobornylphenol. | very light gray, very good condition. | light brown, very good condition. |
| phenyl-beta-naphthylamine | brown, very good condition. | brown, very good condition. |
| blank | cream, very good condition. | medium brown, heat-cured. |

The data show that both stabilizers prevent curing on aging. The phenyl-beta-naphthylamine caused appreciable discoloration; whereas little discoloration was observed with the stabilizer of this invention.

A sample of the dried coagulum containing 2 per cent of the stabilizer of this invention was compounded according to the following formula:

| | |
| --- | --- |
| Copolymer + stabilizer | 100.0 |
| Ultramarine blue | 0.2 |
| Sulfur | 4.0 |
| Coumarone resin | 7.0 |
| Magnesium oxide | 5.0 |
| Accelerator | 2.0 |
| Wax | 2.0 |
| Titanium dioxide | 30.0 |
| Zinc oxide | 110.0 |

Samples of this stock were cured 60 minutes at 300° F. and exposed to artificial sunlight with the following results:

Table X
EXPOSURE TESTS

| Original Color | Color after 8 Days under Sunlamp at 7 Inches | Color after 4 Hours in Fadeometer at 125° F. |
| --- | --- | --- |
| white | white | light cream. |

The stabilizer used was 2,4-dimethyl-6-isobornylphenol. The results of the tests show that this stabilizer causes very little discoloration when exposed to ultraviolet light. An identical copolymer composition, similarly compounded in every respect but containing phenyl-beta-naphthylamine instead of the terpenylphenol, would discolor badly when subjected to similar aging.

A tapered dumbbell strip of the given composition, stretched 12½ per cent, was exposed to natural weathering for one month. It showed no discoloration or checking. A composition of the same formula, except it contained phenyl-beta-naphthylamine as stabilizer, similarly treated, turned a light brown in the same period of time.

Thus, the terpenylphenols, used generally in amounts of about 0.01 to 10 per cent, are stabilizers for natural rubber and for synthetic rubbers generally, such as the copolymers of acrylonitrile and butadiene, copolymers of a conjugated diolefin and a vinyl benzene, etc.

The new terpenylalkyl phenols are described and claimed in my copending application Serial No. 173,489, filed July 12, 1950.

Modifications may be made in the formulae, etc., disclosed without departing from the scope of the appended claims.

What I claim is:

1. Material of the class consisting of rubber and rubber-like copolymer of butadiene and a monomer of the class consisting of styrene and acrylonitrile stabilized with a small amount of amine-free phenol substituted in the 2, 4 and 6 positions by a substituent of the class consisting of terpenyl substituents and alkyl substituents of one to five carbon atoms, said phenol being substituted by at least one terpenyl substituent and at least one alkyl substituent.

2. Cured rubber stabilized with a small amount of 2,4-dialkyl-6-terpenylphenol, each alkyl group containing one to five carbon atoms.

3. Rubber-like coagulum of butadiene and styrene stabilized with a small amount of 2,4-dialkyl-6-terpenylphenol, each alkyl group containing one to five carbon atoms.

4. Rubber-like coagulum of copolymer of butadiene and acrylonitrile stabilized with a small amount of 2,4-dialkyl-6-terpenylphenol, each alkyl group containing one to five carbon atoms.

5. Cured, rubber-like copolymer of butadiene and acrylonitrile stabilized with a small amount of 2,4-dialkyl-6-terpenylphenol, each alkyl group containing one to five carbon atoms.

6. Cured, rubber-like copolymer of butadiene and styrene stabilized with a small amount of 2,4-dialkyl-6-terpenylphenol.

7. The process of curing a material of the class consisting of rubber and rubber-like copolymer of butadiene and a monomer of the class consisting of styrene and acrylonitrile which comprises heating the same with sulfur and a small amount of amine-free phenol substituted in the 2,4 and 6 positions by a substituent of the class consisting of terpenyl substituents and alkyl substituents of one to five carbon atoms, said phenol being substituted by at least one alkyl substituent and at least one terpenyl substituent.

8. The process of curing rubber which comprises heating the same with sulfur and a small amount of 2,4-dialkyl-6-terpenylphenol, each alkyl group containing one to five carbon atoms.

9. The process of drying rubber-like copolymer of butadiene and styrene which comprises heating the same with a small amount of 2,4-dialkyl-6-terpenylphenol.

10. The process of drying rubber-like copolymer of butadiene and acrylonitrile which comprises heating the same with a small amount of 2,4-dialkyl-6-terpenylphenol.

11. Material of the class consisting of rubber and rubber-like copolymer of butadiene and a monomer of the class consisting of styrene and acrylonitrile, stabilized with a small amount of 2,4-dimethyl-6-terpenylphenol.

12. Rubber stabilized with a small amount of 2,4-dimethyl-6-terpenylphenol.

13. Rubber-like coagulum of copolymer of butadiene and styrene stabilized with a small amount of 2,4-dimethyl-6-terpenylphenol.

14. Rubber-like coagulum of copolymer of butadiene and acrylonitrile stabilized with a small amount of 2,4-dialkyl-6-terpenylphenol.

15. Cured, rubber-like copolymer of butadiene and styrene stabilized with a small amount of 2,4-dimethyl-6-terpenylphenol.

16. Cured, rubber-like copolymer of butadiene and acrylonitrile stabilized with a small amount of 2,4-dimethyl-6-terpenylphenol.

17. Rubber-like coagulum of butadiene and acrylonitrile stabilized with a small amount of 2,4-dimethyl-6-isobornylphenol.

18. Cured, rubber-like copolymer of butadiene and acrylonitrile stabilized with a small amount of 2,4-dimethyl-6-isobornylphenol.

LELAND J. KITCHEN.

REFERENCES CITED

The following references are of record in the file of this patent:

UNITED STATES PATENTS

| Number | Name | Date |
|---|---|---|
| 1,989,788 | Calcott et al. | Feb. 5, 1935 |
| 1,991,999 | Bunbury et al. | Feb. 19, 1935 |
| 2,052,860 | Wilson | Sept. 1, 1936 |
| 2,060,965 | Wilson | Nov. 17, 1936 |
| 2,123,898 | Honel et al. | July 19, 1938 |
| 2,181,823 | Stevens | Nov. 28, 1939 |
| 2,356,929 | Hart | Aug. 29, 1944 |
| 2,385,258 | Clifford | Sept. 18, 1945 |
| 2,394,754 | D'Alelio | Feb. 12, 1946 |

Certificate of Correction

Patent No. 2,537,636　　　　　　　　　　　　　　　　January 9, 1951

LELAND J. KITCHEN

It is hereby certified that error appears in the printed specification of the above numbered patent requiring correction as follows:

Column 2, line 33, after "isobornyl-" insert a comma; column 11, lines 33 and 44, for "vulcanite" read *vulcanizate*; line 64, for "coplymers" read *copolymers*;

and that the said Letters Patent should be read as corrected above, so that the same may conform to the record of the case in the Patent Office.

Signed and sealed this 21st day of August, A. D. 1951.

[SEAL]

THOMAS F. MURPHY,
*Assistant Commissioner of Patents.*